United States Patent
Kawabata et al.

(10) Patent No.: US 6,603,129 B2
(45) Date of Patent: Aug. 5, 2003

(54) PROCESS FOR PREPARING RARE EARTH ACTIVATED ALKALINE EARTH METAL FLUOROHALIDE STIMULABLE PHOSPHOR PARTICLES

(75) Inventors: Kanae Kawabata, Tokyo (JP); Takehiko Shoji, Tokyo (JP); Kiyoshi Hagiwara, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/047,069

(22) Filed: Jan. 14, 2002

(65) Prior Publication Data

US 2002/0171046 A1 Nov. 21, 2002

(30) Foreign Application Priority Data

Jan. 18, 2001 (JP) ......................................... 2001-010140

(51) Int. Cl.$^7$ ............................................... G03B 42/02
(52) U.S. Cl. ............................... 250/484.4; 252/301.4
(58) Field of Search ..................... 250/484.4; 252/301.4

(56) References Cited

U.S. PATENT DOCUMENTS

| | | | | |
|---|---|---|---|---|
| 5,166,456 A | * | 11/1992 | Yoshino | 250/484.1 |
| 5,534,191 A | * | 7/1996 | Hasegawa et al. | 252/301.4 |
| 5,786,600 A | * | 7/1998 | Lambert et al. | 250/484.4 |
| 5,904,995 A | * | 5/1999 | Maezawa et al. | 428/690 |
| 6,483,122 B1 | * | 11/2002 | Maezawa et al. | 250/582 |
| 2002/0070351 A1 | * | 6/2002 | Yanagita et al. | 250/484.4 |
| 2002/0195578 A1 | * | 12/2002 | Yanagita et al. | 250/581 |

\* cited by examiner

Primary Examiner—Diego Gutierrez
Assistant Examiner—Gail Verbitsky
(74) Attorney, Agent, or Firm—Frishauf, Holtz, Goodman & Chick, P.C.

(57) ABSTRACT

A preparation process of a particulate rare earth activated alkaline earth metal fluorohalide stimulable phosphor represented by formula (1) is disclosed, wherein precursor particles of the stimulable phosphor, prepared in the liquid phase process are covered with fine particles of at least two kinds of metal oxides and then subjected to calcination. A radiation image conversion panel containing the stimulable phosphor particles is also disclosed.

$$Ba_{(1-x)}M^2{}_xFX{:}yM^1, zLN \qquad \text{formula (1)}$$

20 Claims, 1 Drawing Sheet

PHOSPHOR LAYER

SUPPORT

PROCESS FOR PREPARING RARE EARTH ACTIVATED ALKALINE EARTH METAL FLUOROHALIDE STIMULABLE PHOSPHOR PARTICLES

FIELD OF THE INVENTION

The present invention relates to a process for preparing rare earth activated alkaline earth metal fluorohalide stimulable phosphor particles and rare earth activated alkaline earth metal fluorohalide stimulable phosphor particles, and in particular to a process for preparing rare earth activated alkaline earth metal fluorohalide stimulable phosphor particles without causing deterioration of performance due to moisture absorption and rare earth activated alkaline earth metal fluorohalide stimulable phosphor particles.

BACKGROUND OF THE INVENTION

Radiographic images such as X-ray images are frequently employed for use in medical diagnosis. To obtain such X-ray images, radiography is employed, in which X-rays transmitted through an object are irradiated onto a phosphor layer (so-called fluorescent screen), thereby producing visible light, which exposes silver salt photographic film and the thus exposed film is developed in such a manner similar to that conducted in conventional photography. Recently, there has been introduced a technique of reading images directly from the phosphor layer, without using the silver salt photographic film. However, this phosphor layer exhibits relatively high hygroscopicity, thereby easily leading to lowering in sensitivity and therefore, a technique for enhancing moisture resistance has been strongly sought.

As such a technique, there is known a method, in which radiation transmitted through an object is allowed to be absorbed by a phosphor, followed by exciting the phosphor with light or thermal energy to release radiation energy stored therein as fluorescent light emission, and the emitted fluorescent light is detected to form images. Exemplarily, a radiation image conversion method using stimulable phosphors is known, as described in U.S. Pat. No. 3,859,527 and JP-A No. 55-12144 (hereinafter, the term, JP-A refers to an unexamined and published Japanese Patent Application).

In this method, a radiation image conversion panel containing a stimulable phosphor is employed. Thus, a stimulable phosphor layer of the radiation image conversion panel is exposed to radiation transmitted through an object to store radiation energies corresponding to respective portions of the object, followed by sequentially exciting the stimulable phosphor with an electromagnetic wave such as visible light or infrared rays (hereinafter referred to as "stimulating rays") to release the radiation energy stored in the phosphor as light emission (stimulated emission), photo-electrically detecting the emitted light to obtain electric signals, and reproducing the radiation image of the object as a visible image from the electrical signals on a recording material such as photographic film or a CRT.

The foregoing radiation image recording and reproducing method has an advantage in that radiation images having abundant information content can be at a low exposure dose relative to conventional radiography using the combination of a conventional radiographic film and intensifying screen.

Stimulable phosphors are phosphor material that, after having been exposed to radiation rays, causes stimulated emission by exposing to stimulating rays. Phosphors capable of causing stimulated emission at a wavelength of 400 to 900 nm with a stimulating ray of 400 to 900 nm are generally applied to practical use.

Examples of the stimulable phosphor used in the radiation image conversion panel include, (1) a rare earth activated alkaline earth metal fluorohalide phosphor represented by the formula of $(Ba_{1-x}, M^{2+}{}_x)FX:yA$, as described in JP-A No. 55-12145, in which $M^{2+}$ is at least one of Mg, Ca, Sr, Zn and Cd; X is at least one of Cl, Br and I; A is at least one of Eu, Tb, Ce, Tm, Dy, Pr, Ho, Nd, Yb, and Er; x and y are numbers meeting the conditions of $0 \leq x \leq 0.6$ and $0 \leq y \leq 0.2$; and the phosphor may contain the following additives:

X', BeX" and $M^3 X_3'''$, as described in JP-A No. 56-74175 (in which X', X" and X''' are respectively at least a halogen atom selected from the group of Cl, Br and I; and $M^3$ is a trivalent metal);

a metal oxide described in JP-A No. 55-160078, such as BeO, BgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$ or $ThO_2$;

Zr and Sc described in JP-A No. 56-116777;

B described in JP-A No. 57-23673;

As and Si described in JP-A No. 57-23675;

M·L (in which M is an alkali metal selected from the group of Li, Na, K, Rb and Cs; L is a trivalent metal Sc, Y, La, Ce, Pr, Nd, Pm, Sm, Gd, Tb, Dy, Ho, Er, Tm, Yb, Lu, Al, Ga, In, and Tl) described in JP-A 58-206678;

calcined tetrafluoroboric acid compound described in JP-A No. 59-27980;

calcined, univalent or divalent metal salt of hexafluorosilic acid, hexafluorotitanic acid or hexafluorozirconic acid described in JP-A No. 59-27289;

NaX' described in JP-A No. 59-56479 (in which X' is at least one of Cl, Br and I);

a transition metal such as V, Cr, Mn, Fe, Co or Ni, as described in JP-A No. 59-56479;

$M^1X'$, $M'^2X''$, $M^3X'''$ and A, as described in JP-A No. 59-75200 (in which $M^1$ is an alkali metal selected from the group of Li, Na, K, Rb and Cs; $M'^2$ is a divalent metal selected from the group of Be and Mg; $M^3$ is a trivalent metal selected from the group Al, Ga, In and Tl; A is a metal oxide; X', X" and X''' are respectively a halogen atom selected from the group of F, Cl, Br and I); $M^1X'$ described in JP-A No. 60-101173 (in which $M^1$ is an alkali metal selected from the group of Rb and Cs; and X' is a halogen atom selected from the group of F, Cl, Br and I);

$M^{2'}X'_2 \cdot M^{2'}X''_2$ (in which $M^{2'}$ is at least an alkaline earth metal selected from the group Ba, Sr and Ca; X' and X" are respectively a halogen atom selected from the group of Cl, Br and I, and $X' \neq X''$); and $LnX''_3$ described in JP-A No. 61-264084 (in which Ln is a rare earth selected from the group of Sc, Y, La, Ce, Pr, Nd, Pm, Sm, Gd, Tb, Dy, Ho, Er, Tm, Yb and Lu; X" is a halogen atom selected from the group of F, Cl, Br and I);

(2) a divalent europium activated alkaline earth metal halide phosphor described in JP-A No. 60-84381, represented by the formula of $M^2 X_2 \cdot aM^{2'}{}_2 : xEu^{2+}$ (in which $M^2$ is an alkaline earth metal selected from the group of Ba, Sr and Ca; X and X' is a halogen atom selected from the group of Cl, Br and I and $X \neq X'$; a and x are respectively numbers meeting the requirements of $0 \leq a \leq 0.1$ and $0 < x \leq 0.2$);

the phosphor may contain the following additives;

$M^1 X''$ described in JP-A No. 60-166379 (in which $M^1$ is an alkali metal selected from the group of Rb, and Cs; X" is a halogen atom selected from the group of F, Cl, Br and I;

KX'', MgX$_2$''' and M$^3$X$_3$'''' described in JP-A No. 221483 (in which M$^3$ is a trivalent metal selected from the group of Sc, Y, La, Gd and Lu; X'', X''' and X'''' are respectively a halogen atom selected from the group of F, Cl Br and I;

B described in JP-A No. 60-228592;

an oxide such as SiO$_2$ or P$_2$O$_5$ described in JP-A No. 60-228593;

LiX'' and NaX'' (in which X'' is a halogen atom selected from the group of F, Cl, Br and I;

SiO$_2$ described in JP-A No. 61-120883;

SnX$_2$' described in JP-A 61-120885 (in which X'' is a halogen atom selected from the group of F, Cl, Br and I;

CsX'' and SnX$_2$''' described in JP-A No. 61-235486 (in which X'' and X''' are respectively a halogen atom selected from the group of F, Cl, Br and I;

CsX'' and Ln$^{3+}$ described in JP-A 61-235487 (in which X'' is a halogen atom selected from the group of F, Cl, Br and I; Ln is a rare earth element selected from the group of Sc, Y, Ce, Pr, Nd, Sm, Gd, Tb, Dy, Ho, Er, Tm, Yb and Lu;

(3) a rare earth element activated rare earth oxyhalide phosphor represented by the formula of LnOX:xA, as described in JP-A No. 55-12144 (in which Ln is at least one of La, Y, Gd and Lu; A is at least one of Ce and Tb; and x is a number meeting the following condition, 0x<0.1);

(4) a cerium activated trivalent metal oxyhalide phosphor represented by the formula of M(II)OX:xCe, as described in JP-A No. 58-69281 (in which M(II) is an oxidized metal selected from the group of Pr, Nd, Pm, Sm, Eu, Tb, Dy, Ho, Er, Tm, Yb and Bi; X is a halogen atom selected from the group of Cl, Br and I; x is a number meeting the following condition, 0<x<0.1;

(5) a bismuth activated alkali metal halide phosphor represented by the formula of M(I)X:xBi, as described in JP-A No.62-25189 (in which M(I) is an alkali metal selected from the group of Rb and Cs; X is a halogen atom selected from the group of Cl, Br and I; x is a number meeting the following condition, 0<x<0.2;

(6) a divalent europium activated alkaline earth metal halophosphate phosphor represented by the formula of M(II)$_5$(PO$_4$)$_3$X:xEu$^{2+}$, as described in JP-A No. 60-141783 (in which M(II) is an alkaline earth metal selected from the group of Ca, Sr and Ba; X is a halogen atom selected from the group of F, Cl, Br and I; x is a number meeting the following condition, 0<x≦0.2);

(7) a divalent europium activated alkaline earth metal haloborate phosphor represented by the formula of M(II)$_2$BO$_3$X:xEu$^{2+}$, as described in JP-A No. 60 157099 (in which M(II) is an alkaline earth metal selected from the group of Ca, Sr and Ba; X is a halogen atom selected from the group of Cl, Br and I; x is a number meeting the following condition, 0<x≦0.2);

(8) a divalent europium activated alkaline earth metal halophosphate phosphor represented by the formula of M(II)$_2$PO$_4$X:xEu$^{2+}$, as described in JP-A No. 60-157100 (in which M(II) is an alkaline earth metal selected from the group of Ca, Sr and Ba; X is a halogen atom selected from the group of Cl, Br and I; x is a number meeting the following condition, 0<x≦0.2);

(9) a divalent europium activated alkaline earth metal hydrogenated halide phosphor represented by the formula of M(II)HX:xEu$_{2+}$, as described in JP-A No. 60-217354 (in which M(II) is an alkaline earth metal selected from the group of Ca, Sr and Ba; X is a halogen atom selected from the group of Cl, Br and I; x is a number meeting the following condition, 0<x≦0.2);

(10) a cerium activated rare earth complex halide phosphor represented by the formula of LnX$_3$.aLn'X$_3$':xCe$^{3+}$, as described in JP-A No. 61-21173 (in which Ln and Ln' are individually a rare earth element selected from the group of Y, La, Gd and Lu; X and X' are respectively a halogen atom selected from the group of F, Cl, Br and I and X≠X'; a and x are respectively numbers meeting the following conditions, 0.1<a≦10.0 and 0<x≦0.2;

(11) a cerium activated rare earth complex halide phosphor represented by the formula of LnX$_3$.aM(I)X':xCe$^{3+}$, as described in JP-A 61-21182 (in which Ln and Ln' are respectively a rare earth element selected from the group of Y, La, Gd and Lu; M(I) is an alkali metal selected from the group of Li, Na, k, Cs and Rb; X and X' are respectively a halogen atom selected from the group of Cl, Br and I; a and x are respectively numbers meeting the following conditions, 0.1<a≦10.0 and 0<x≦0.2;

(12) a cerium activated rare earth halophosphate phosphor represented by the formula of LnPO$_4$.aLnX$_3$:xCe$^{3+}$, as described in JP-A No. 61-40390 (in which Ln is a rare earth element selected from the group of Y, La, Gd and Lu; X is a halogen atom selected from the group of F, Cl, Br and I; a and x are respectively numbers meeting the following conditions, 0.1<a≦10.0 and 0<x≦0.2;

(13) a divalent europium activated cesium rubidium halide phosphor represented by the formula of CsX:aRbX':xEu2+, as described in JP-A No. 61-236888 (in which X and X' are individually a halogen atom selected from the group of Cl, Br and I; a and x are respectively numbers meeting the following conditions, 0.1<a≦10.0 and 0<x≦0.2;

(14) a divalent europium activated complex halide phosphor represented by the formula of M(II)X$_2$.aM(I)X':xEu$^{2+}$, as described in JP-A No. 61-236890 (in which M(II) is an alkaline earth metal selected from the group of Ba, Sr and Ca; M(I) is an alkali metal selected from the group of Li, Rb and Cs; X and X' are respectively a halogen atom selected from the group of Cl, Br and I; a and x are respectively numbers meeting the following conditions, 0.1<a≦20.0 and 0<x≦0.2.

Of the foregoing stimulable phosphors, an iodide-containing divalent europium activated alkaline earth metal fluorohalide phosphor, iodide-containing divalent europium activated alkaline earth metal halide phosphor, iodide-containing rare earth element activated rare earth oxyhalide phosphor and iodide-containing bismuth activated alkali metal halide phosphor exhibit stimulated emission having relatively high luminance.

Radiation image conversion panels using these stimulable phosphors, after storing radiation image information, release stored energy by scanning with stimulating light so that after scanning, radiation images can be again stored and the panel can be used repeatedly. In conventional radiography, a radiographic film is consumed for each photographing exposure; in the radiation image conversion method, however, the radiation image conversion panel is repeatedly used, which is advantageous in terms of natural resource conservation and economic efficiency.

It is therefore desirable to provide performance capable of withstanding for the use over a long period of time, without deteriorating radiation image quality, to the radiation image conversion panel. However, in general, stimulable phosphors used in the radiation image conversion panel are so hygroscopic that when allowed to stand in a room under usual climatic conditions, the phosphor absorbs atmospheric moisture and is deteriorated over an elapse of time. Exemplarily, when the stimulable phosphor is allowed to stand under high humidity, radiation sensitivity is lowered along with an increase in absorbed moisture content. In general, radiation latent images recorded onto the stimulable phosphor, after being exposed to radiation rays, regress over an elapse of time and the period between exposure to radiation rays and the phosphor exhibits such behavior that scanning with stimulating light requires longer time, the intensity of reproduced radiation image signal becomes less, so that moisture absorption of the stimulable phosphor accelerates the foregoing latent image regression. Accordingly, the use of a radiation image conversion panel having such a moisture-absorbing stimulable phosphor often lowers reproducibility of reproduced signals at the time of reading radiation images.

It is generally known that stimulability of stimulable phosphor particles depends on their particle sizes and the preferred average particle size is 1 to 30 μm. The relationship between the average particle size and characteristics such as sensitivity, graininess and sharpness is disclosed in JP-B No. 3-79680 (hereinafter, the term, JP-B refers to a published Japanese Patent).

An attempt to control the size or form of stimulable phosphor particles in the liquid phase process is disclosed in JP-A 7-233369. In the preparation of rare earth activated alkaline earth metal fluorohalide stimulable phosphors, the conventional method is that raw materials such as an alkaline earth metal fluoride, an alkaline earth metal halide other than the fluoride and a rare earth element are mixed in a dry process or dispersed in an aqueous medium, thereafter, the mixture is calcined and ground. On the contrary, there is disclosed a liquid phase process, in which a rare earth activated alkaline earth metal fluorohalide phosphor is precipitated in an aqueous solution. The foregoing liquid phase process enables to obtain rare earth activated alkaline earth metal fluorohalide stimulable phosphor particles of small and homogeneous particle size with no deterioration in performance due to grinding.

However, enhancing sensitivity or rendering particles smaller produced problems such as deterioration due to moisture. The deterioration is initiated at the moment when the phosphor particles, after calcination, are exposed to the atmosphere and to prevent such a deterioration, storage of calcined phosphor particles under an environment screened from the atmosphere was contemplated but it was essentially difficult to conduct the whole process of preparing a phosphor plate under such an environment. To prevent the foregoing deterioration in performance of stimulable phosphor particles due to moisture absorption, there were proposed the use of a titanate-type coupling agent described in JP-B No. 2-27819, the use of silicone oil described in JP-B 5-52919, and a technique described in JP-B 11-270155, in which stimulable phosphor precursor particles were calcined in the presence of metal oxide particles and the calcined phosphor particles were covered with a metal alkoxide. However, none of these proposals led to viable solution.

SUMMARY OF THE INVENTION

Accordingly, it is an object of the invention to overcome the foregoing problems arisen with radiation image conversion panels using stimulable phosphors and to provide a preparation process of phosphor particles which are easily subjected to a moisture-proofing treatment and used for radiation image conversion panels with no deterioration in performance due to moisture absorption and usable in a viable state over a long period of time.

The above object of the present invention can be achieved by the following constitutions:

1. A preparation process of a rare earth activated alkaline earth metal fluorohalide stimulable phosphor particles represented by the following formula (1):

$$Ba_{(1-x)}M^2_xFX:yM^1, zLn \qquad \text{formula (1)}$$

wherein $M^2$ is at least one alkaline earth metal selected from the group consisting of Mg, Ca, Sr, Zn and Cd; $M^1$ is at least an alkali metal selected from the group consisting of Li, Na, K, Rb and Cs; X is at least one halogen atom selected from the group consisting of Cl, Br and I; Ln is at least one rare earth element selected from the group consisting of Ce, Pr, Sm, Eu, Gd, Tb, Tm, Dy, Ho, Nd, Er and Yb; and x, y and z are numbers within the range of $0 \leq x \leq 0.6$, $0 \leq y \leq 0.05$ and $0 < z \leq 0.2$, respectively;

the process comprising:
preparing particles of a precursor of the stimulable phosphor in a liquid phase process,
covering the precursor particles with fine particles of at least two kinds of metal oxides, and then
subjecting the precursor particles to calcination;

2. A rare earth activated alkaline earth metal fluorohalide stimulable phosphor particles represented by the foregoing formula (1), covered with fine particles of at least two kinds of metal oxides and prepared by the process described in 1. above;

3. A radiation image conversion panel comprising a support having thereon a phosphor layer containing the stimulable phosphor particles prepared by the process described in 1. above.

Further, preferred embodiments of the invention are as follows:

4. The rare earth activated alkaline earth metal fluorohalide stimulable phosphor particles described in 2. above, wherein the total amount of the metal oxide particles 0.001% to 10% by weight, based on the stimulable phosphor precursor, and the ratio of the two kinds of metal oxides is within the range of 1:2 to 1:10;

5. The preparation process described in 1. above, wherein the average size of the metal oxide particles is 2 to 50 nm;

6. The preparation process described in 1. above, wherein the total amount of the metal oxide particles 0.001% to 10% by weight, based on the stimulable phosphor precursor.

DETAILED DESCRIPTION OF THE INVENTION

Figure 1:
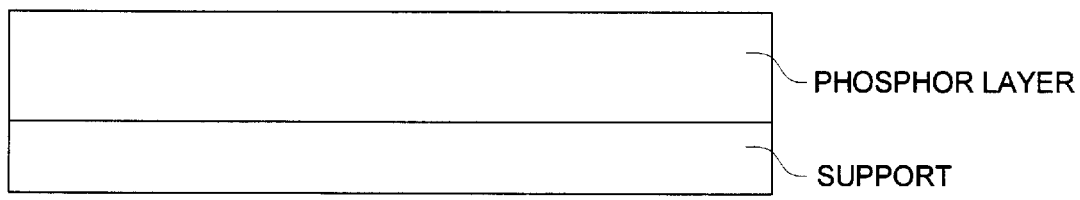
FIG. 1 shows a radiation image conversion panel comprising a support having a phosphor layer.

In this invention, the precursor of a stimulable phosphor refers to a substance substantially exhibiting no stimulated light emission or no instantaneous emission. An example thereof is a substance represented by formula (1), which has not been exposed under an atmosphere of a temperature of 600° C. or more. In the invention, particles of a precursor of the stimulable phosphor represented by the foregoing formula (1) are prepared in the liquid phase process, in which the particle size can be readily controlled rather than by the solid phase process in which control of the particle size is difficult. The representative preparation process of the stimulable phosphor precursor in the liquid phase process is as follows. Thus, the process comprises the steps of:

(a) preparing an aqueous mother liquor containing $BaX_2$ of not less than 2.0 mol/l and a halide of Ln, in which X is Cl, Br or I, provided that when x of the foregoing formula (1) is not zero, the mother liquor further contains a halide of $M^2$, and when y is not zero, the mother liquor further contains a halide of $M^1$, (b) adding an aqueous solution containing an inorganic fluoride of not less than 5 mol/l to the mother liquor while maintaining the mother liquor at a temperature of at least 50° C. to form a crystalline precipitate of a precursor of the rare earth activated alkaline earth metal fluorohalide stimulable phosphor, and (c) separating the precipitate of the precursor from the mother liquor to obtain the precursor particles.

Thus, $BaX_2$ (X=Cl, Br or I), and, if necessary, a halide of $M^2$ and a halide of $M_1$ are introduced into an aqueous medium and dissolved with sufficiently stirring to form an aqueous solution (hereinafter, also denoted as mother liquor), provided that the ratio of $BaX_2$ to the aqueous medium is so adjusted that the $BaX_2$ concentration is not less than 2.0 mol/l, preferably not less than 2.5 mol/l, more preferably not less than 3.5 mol/l, and still more preferably not less than 4.3 mol/l. In this case, a small amount of an acid, ammonia, an alcohol, a water-soluble polymer or a fine powdery water-insoluble metal oxide may be optionally added thereto. The aqueous solution is maintained at a temperature of 50° C. or more, preferably 80° C. or more, and 98° C. or less as the upper limit. Further, an aqueous solution of an inorganic fluoride (e.g., ammonium fluoride, alkali metal fluoride) of not less than 5 mol/l, preferably not less than 8 mol/l, more preferably not less than 12 mol/l, and 15 mol/l or less as the upper limit is added thereto to form precipitates of a precursor crystal of a rare earth activated alkaline earth metal fluorohalide stimulable phosphor. One feature of the foregoing process is that a halide of Ln is contained in mother liquor in advance. The halide of Ln is preferably allowed to exist in the mother liquor prior to addition of an inorganic fluoride. Thus, the addition of the halide of Ln results in phosphor precursor particles which occlude Ln mainly in the center of the particle, leading to enhanced durability of phosphor particles and a radiation image conversion panel by the phosphor particles.

In another embodiment of the invention, the process for preparing the phosphor precursor comprises the steps of:

(a) preparing an mother liquor containing an ammonium halide of not less than 3 mol/l and a halide of Ln, provided that when x of the formula (1) is not zero, the mother liquor further contains a halide of $M^2$, and when y is not zero, the mother liquor further contains a halide of $M^1$, (b) adding an aqueous solution containing an inorganic fluoride of not less than 5 mol/l and an aqueous solution containing $BaX_2$ (in which X is Br or I) to the mother liquor while maintaining the mother liquor at a temperature of at least 50° C. to form a crystalline precipitate of a precursor of the stimulable phosphor, and then (c) separating the precipitate from the mother liquor.

Thus, A mother liquor containing an ammonium halide ($NH_4Cl$, $NH_4Br$ and $NH_4I$) of not less than 3 mol/l, and preferably not less than 4 mol/l is prepared, with proviso that when x of formula (1) is not zero, the mother liquor further contains a halide of M2, and when a is not zero, the mother liquor further contains a halide of $M^1$, and after these are dissolved, the ammonium halide is added thereto. Further thereto, an aqueous solution of an inorganic halide (e.g., ammonium fluoride, alkali metal fluoride) of not less than 5 mol/l (preferably not less than 8 mol/l, and more preferably not less than 12 mol/l) and an aqueous $BaX_2$ (X=Cl, Br, I) solution are added while maintaining the mother liquor at a temperature of 50° C. or higher, preferably 80° C. or higher, and 98° C. or lower as the upper limit. The crystalline precursor of a rare earth activated alkaline earth metal fluorohalide stimulable phosphor can be thus obtained. In the foregoing preparation process, a halide of Ln is preferably allowed to exist in the mother liquor prior to addition of an inorganic fluoride. Thus, the addition of the halide of Ln results in phosphor precursor particles which occlude Ln mainly in the center of the particle, leading to enhanced durability of phosphor particles and a radiation image conversion panel by the phosphor particles.

During the course of study of deterioration in sensitivity due to moisture absorption of the stimulable phosphor represented by the foregoing formula (1), it was found by the inventors of the present invention that deterioration in performance was caused by deliquescence of the phosphor due to moisture absorption and alteration of the phosphor. The deliquescence refers to a phenomenon in which the phosphor absorbs moisture from ambient air, forming an aqueous solution by itself and the alteration is a phenomenon in which deliquescence is not caused but fluorescence characteristics of the phosphor are altered by moisture present in the air. The mechanism of the alteration is not fully understood but it is supposed to be related to discoloration in the interior of the phosphor particle.

The moisture absorption of the phosphor is assumed to occur due to various causes including capillary condensation and once water vapor is condensed as water drops between phosphor particles, causing deliquescence and leading to deterioration in performance.

As a result of the inventors' study to prevent the deterioration phenomena, it was found that phosphor precursor particles were covered with finer particles of at least two kinds of metal oxides as a sintering-preventive, followed by calcination, thereby enhancing prevention of deliquescence and alteration of the phosphor. Specifically, it was found that coverage of the phosphor precursor with $Al_2O_3$ particles and $SiO_2$ particles, followed by calcination thereof resulted in further enhanced prevention of deliquescence and alteration of the phosphor.

There is generally known a technique of providing water resistance to powdery inorganic material by a treatment with a silane coupling agent. As a result of the inventors' testing, however, it was proved to be difficult to form a silicon-containing coating directly with a silane coupling agent on the surface of stimulable phosphor particles.

It is supposed that covering phosphor precursor particles with fine metal oxide particles and subsequent calcination thereof, followed by a surface treatment of the calcined phosphor particles by a silane coupling agent leads to formation of a silicon-containing coating with a silane coupling agent so as to fill in portions surrounding metal oxide particles dispersed on the phosphor particles to form a continuous phase. As a result thereof, the silane coupling agent is supposed to effectively function therein.

On the other hand, even when phosphor precursor particles with no coverage of fine metal oxide particles is calcined, followed by coverage with fine metal oxide particles and a surface treatment by a silane coupling agent, phosphor particles exhibiting high moisture resistance can be obtained. However, there occurred a phenomenon that when the thus prepared phosphor particles were coated, as a phosphor layer, on a support through stages of dispersion, solution preparation and coating, the effect of enhanced moisture resistance was reduced by half. Such a phenomenon is attributed to the fine metal oxide particles being peeled from the phosphor particles. The calcined phosphor particles are supposed to be bonded to the fine metal oxide particle only by an electrical force and a stronger force than this electrical force acts thereon during the stage of dispersion, solution preparation and coating, causing peeling.

In the phosphor particles obtained by calcining phosphor precursor particles having been covered with fine particles of at least two kinds of metal oxides according to the invention, the effect of the surface treatment by the silane coupling agent effectively functions, and thereby, phosphor particles exhibiting enhanced moisture resistance and enhanced sensitivity relative to phosphor particles prepared by commonly known methods were obtained and even when coated on the support in the form of a phosphor layer, the enhanced moisture resistance of the particles was maintained.

Preferred silane coupling agent used in the invention are represented by the following formula:

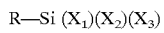

wherein R represents an aliphatic or aromatic hydrocarbon group, in which an unsaturated group (e.g., vinyl group) may intervene and which may be substituted by a substituent such as ROR'—, RCOOR'— or RNHR'— (in which R represents an alkyl group or aryl group and R' represents an alkylene or arylene group); $X_1$, $X_2$ and $X_3$ each an aliphatic or aromatic hydrocarbon group, an acyl group, amido group, alkoxy group, an alkylcarbonyl group, epoxy group, mercapto group of a halogen atom, provided that $X_1$, $X_2$ and $X_3$ may be identical or different and at least of $X_1$, $X_2$ and $X_3$ is a group except for the hydrocarbon group. Furthermore, $X_1$, $X_2$ and $X_3$ each are preferably one liable to be hydrolyzed.

Examples of silane coupling agent used in the invention include methyltrimethoxysilane, methyltriethoxysilane, vinyltriacetoxysilane, vinyltrichlorosilane, vinyltriethoxysilane, γ-chloropropyltrimethoxysilane, γ-chloropropylmethyldichlorosilane, γ-chloropropylmethyl-dimethoxysilane, γ-chloropropylmethyldiethoxysilane, γ-aminopropyltriethoxysilane, N-(β-amino)-γ-aminopropyl-trimethoxysilane, N-(β-amino)-γ-aminopropylmethyldimethoxy-silane, γ-mercaptopropyltrimethoxysilane, γ-mercaptopropyl-methyldimethoxysilane, γ-glycidoxypropyltrimethoxysilane, γ-glycidoxypropylmethyldimethoxysilane, γ-methacryloxypropyl-trimethoxysilane, γ-methacryloxypropylmethyldimethoxysilane, γ-(2-aminoethyl)aminopropyltrimethoxysilane, γ-isocyanatopropyl-triethoxysilane, γ-(2-aminoethyl)aminopropylmethyldimethoxy-silane, γ-anilinopropyltrimethoxysilane, vinyltrimethoxysilane, N-β-(N-vinylbenzylaminoethyl)-γ- aminopropyltromethoxy-silane.hydrochloride, and aminosilane complex compounds. Of these are preferred vinyl type, mercapto type, glycidoxy type, and methacryloxy type silanes, and the mercapto type silanes are more preferred.

To allow the silane coupling agent or metal alkoxide to be adhered onto phosphor particles coated with metal oxide particles, any method known in the art is usable. Examples thereof include a dry processing method in which a silane coupling agent or a metal alkoxide is dropwise added or sprayed to phosphor particles with stirring by use of Hencyl mixer; a slurry method in which a silane coupling agent is dropwise added to phosphor particles in the form of slurry with stirring, and after completing addition, the phosphor is precipitated, filtered and dried to remove solvent; a method in which after dispersing a phosphor in a solvent and adding thereto a silane coupling agent or a metal alkoxide, the solvent is evaporated to form a adhered layer; and a method in which a silane coupling agent or a metal alkoxide is added to coating solution of a phosphor. Drying for the silane coupling agent or metal alkoxide is conducted preferably at 60 to 130° C. over a period of 10 to 200 min.

Maintaining the enhanced moisture resistance and preventing alteration in characteristics even after coating is supposed to be mainly attributed to that when the phosphor particles are covered with metal oxide particles effective for prevention of sintering and then calcined, the metal oxide particles are tightly bonded to the phosphor particles during the calcination stage, rendering the metal oxide particles difficult to be peeled off from the phosphor particles, even during the stage of dispersion, solution preparation and coating.

The metal oxides used in the invention is preferably selected from $Al_2O_3$, $SiO_2$ and $TiO_2$ and the use thereof causes no phenomenon described above and thereby were obtained superior rare earth activated alkaline earth metal fluorohalide stimulable phosphors.

The average size of the metal oxide particles used in the invention is preferably 2 to 50 nm. Particles of the average size of less than 2 nm are difficult to be industrially available and when exceeding 50 nm, it is difficult to satisfactorily cover the particle surface.

In the invention, the total content of the fine metal oxide particles is preferably 0.001 to 10% by weight, based on the stimulable phosphor precursor. The total content of the fine metal oxide particles exceeding 10% results in lowering in sensitivity and the content of less than 0.05% displays no effect of the invention. The ratio by weight of one of the two kinds of metal oxide particles to the other is preferably within the range of 1:10 to 1:2.

When the amount of a silane coupling agent is more than 10% by weight, based on the phosphor, sensitivity is lowered and the coat is hardened, causing cracking. Further, in the case of less than 0.1% by weight, no effect of the invention is observed.

EXAMPLES

Next, the present invention will be described based on examples.

Example 1

Preparation of Europium Activated Barium Fluoroiodide Stimulable Phosphor

To synthesize a precursor of europium activated barium fluoroiodide stimulable phosphor, 2780 ml of an aqueous $BaI_2$ solution (3.6 mol/l) and 27 ml of an aqueous $EuI_3$ solution (0.2 mol/l) were introduced into a reactor vessel.

Reaction mother liquor in the reactor vessel was maintained at a temperature 83° C. with stirring. Using a roller pump, 322 ml of an aqueous ammonium fluoride solution (8 mol/l) was added into the reaction mother liquor to form a precipitate. After completion of the addition, the reaction mixture was further stirred for 2 hrs. with maintaining the temperature to conduct ripening of the precipitate. Next, the precipitate was filtered, washed with ethanol and dried under evacuation to obtain crystalline europium activated barium fluoroiodide (having an average particle size of 2.5 µm). Fine $Al_2O_3$ particles (having an average size of 13 nm) and fine $SiO_2$ particles (having an average size of 17 nm) were selected as a preventive for sintering at the time of calcination (hereinafter, also denoted as a sintering-preventive agent) and added to the phosphor precursor obtained above, in a total amount of 0.2% by weight, based on the phosphor precursor. The mixture was sufficiently stirred by a mixer so that the fine $Al_2O_3$ particles and fine $SiO_2$ particles homogeneously adhered onto the surface of the phosphor precursor particles. In this case, the weight ratio of $Al_2O_3/SiO_2$ was adjusted to ½. The thus obtained phosphor precursor particles were charged into a silica boat and calcined in a hydrogen gas atmosphere at 850° C. for 2 hrs using a tube furnace to obtain europium activated barium fluoroiodide phosphor particles. The particles were subjected to classification to obtain phosphor particles of an average size of 3 µm. The thus obtained phosphor particles were stirred at room temperature in a 1.0 wt % γ-mercaptopropyl-trimethoxy-silane toluene solution to conduct a silane coupling agent treatment and dried at 100° C. for 24 hrs.

Preparation of Radiation Image Conversion Panel
Shows in FIG. 1

To a solvent mixture of methyl ethyl ketone and toluene (1:1) were added 427 g of the foregoing europium activated barium fluoroiodide phosphor having been subjected to the surface treatment of a silane coupling agent, 15.8 g of polyurethane resin (DESMOLAC$_{4125}$, available from Sumitomo-Bayer Urethane Corp.) and 2.0 g of bisphenol A-type epoxy resin and dispersed by a propeller mixer to obtain a coating solution having a viscosity of 25 to 30 Pa·s. The coating solution was coated on a black 100 µm thick PET support and dried at 100° C. for 15 min. to form a 270 µm thick phosphor layer. Thus prepared coating sample was cut to a square of 10 cm×10 cm to obtain a radiation image conversion panel having a stimulable phosphor layer.

Example 2

Preparation of Europium Activated Barium
Fluoroiodide Stimulable Phosphor

A europium activated barium fluoroiodide stimulable phosphor was prepared similarly to Example 1, except that fine $Al_2O_3$ particles and $SiO_2$ particles were used as a preventive for sintering and the weight ratio of $Al_2O_3$ to $SiO_2$ was varied to 1:10.

Preparation of Radiation Image Conversion Panel

A radiation image conversion panel was prepared similarly to Example 1, except that the stimulable phosphor particles were replaced by those having a weight ratio of $Al_2O_3$ to $SiO_2$ of 1:10, as prepared above.

Example 3

Preparation of Europium Activated Barium
Fluoroiodide Stimulable Phosphor

A europium activated barium fluoroiodide stimulable phosphor was prepared similarly to Example 1, except that $Al_2O_3$ fine particles used in Example 1 and $TiO_2$ fine particles having an average size of 20 nm were used a preventive for sintering in a weight ratio of 1:2.

Preparation of Radiation Image Conversion Panel

Using the thus prepared stimulable phosphor, a radiation image conversion panel was prepared similarly to Example 1.

Comparative Example 1

Preparation of Europium Activated Barium
Fluoroiodide Stimulable Phosphor

A europium activated barium fluoroiodide stimulable phosphor was prepared similarly to Example 1, except that $Al_2O_3$ fine particles used in Example 1 was singly used as a preventive for sintering.

Preparation of Radiation Image Conversion Panel

Using the thus prepared stimulable phosphor, a radiation image conversion panel was prepared similarly to Example 1.

Comparative Example 2

Preparation of Europium Activated Barium
Fluoroiodide Stimulable Phosphor

A europium activated barium fluoroiodide stimulable phosphor was prepared similarly to Example 1, except that $SiO_2$ fine particles used in Example 1 was singly used as a preventive for sintering.

Preparation of Radiation Image Conversion Panel

Using the thus prepared stimulable phosphor, a radiation image conversion panel was prepared similarly to Example 1.

Comparative Example 3

Preparation of Europium Activated Barium
Fluoroiodide Stimulable Phosphor

A europium activated barium fluoroiodide stimulable phosphor was prepared similarly to Example 1, except that $TiO_2$ fine particles used in Example 1 was singly used as a preventive for sintering.

Preparation of Radiation Image Conversion Panel

Using the thus prepared stimulable phosphor, a radiation image conversion panel was prepared similarly to Example 1.

Radiation image conversion panels prepared in Examples 1 through 3 and Comparative Examples 1 through 3 were each evaluated in accordance with the procedure described below and results thereof are shown in Table 1.

Evaluation of Initial Sensitivity of Stimulated
Emission

Radiation image conversion panel samples were each exposed to X rays at a tube voltage of 80 kVp and then stimulated by scanning with He—Ne laser (633 nm), in which stimulated light emitted from the stimulable phosphor layer was detected by a photoreceptor (i.e., a photoelectron multiplier having spectral sensitivity of S-5) to measure its intensity. An intensity was represented by a relative value, based on the intensity of Comparative example 1 being 1.0.

Evaluation of Storage Stability in Sensitivity

Radiation image conversion panel samples were allowed to stand under then atmosphere of 30° C. and 70% RH for a period of 3 days and thereafter, the stimulated emission intensity was measure in a manner similar to the foregoing evaluation of the initial sensitivity.

TABLE 1

| Sample No. | Metal Oxide (A) | Metal Oxide (B) | Weight Ratio (A/B) | Initial Sensitivity | Storage Satbility |
|---|---|---|---|---|---|
| Example 1 | $Al_2O_3$ | $SiO_2$ | 1/2 | 1.2 | 0.9 |
| Example 2 | $Al_2O_3$ | $SiO_2$ | 1/10 | 1.5 | 1.3 |
| Example 3 | $Al_2O_3$ | $TiO_2$ | 1/2 | 1.1 | 0.8 |
| Comp. Example 1 | $Al_2O_3$ | — | | 1.0 | 0.3 |
| Comp. Example 2 | $SiO_2$ | — | | 1.1 | 0.5 |
| Comp. Example 3 | $TiO_2$ | — | | 0.7 | 0.2 |

As can be seen from Table 1, radiation image conversion panels obtained by using stimulable phosphors (Examples 1 to 3), which were prepared using two kinds of sintering-preventive agents according to the invention, exhibited superior stimulated emission sensitivity and improved moisture resistance. On the contrary, Comparative Examples 1 and 3, in which $Al_2O_3$ fine or $TiO_2$ fine particles were singly used as a sintering-preventive agent, led to inferior results in stimulated emission sensitivity and storage stability in sensitivity, compared to inventive Examples 1 to 3. Comparative Example 2, in which $SiO_2$ was singly used as a sintering-preventive agent was not so inferior in stimulated emission sensitivity but inferior in storage stability, such as in Comparative Examples 1 and 3.

What is claimed is:

1. A process for preparing a rare earth activated alkaline earth metal fluorohalide stimulable phosphor particles represented by the following formula (1) in a liquid process:

$$Ba_{(1-x)}M^2_xFX:yM^1, zLn \qquad \text{formula (1)}$$

wherein $M^2$ is at least an alkaline earth metal selected from the group consisting of Mg, Ca, Sr, Zn and Cd; $M^1$ is at least an alkali metal selected from the group consisting of Li, Na, K, Rb and Cs; X is at least a halogen atom selected from the group consisting of Cl, Br and I; Ln is at least a rare earth element selected from the group consisting of Ce, Pr, Sm, Eu, Gd, Tb, Tm, Dy, Ho, Nd, Er and Yb; and x, y and z are numbers within the range of $0 \leq x \leq 0.6$, $0 \leq y \leq 0.05$ and $0 < z \leq 0.2$, respectively;

the process comprising:
(a) preparing particles of a precursor of the stimulable phosphor,
(b) covering the particles of the precursor with fine particles of at least two kinds of metal oxides, and then
(c) subjecting the particles of the precursor to calcination to obtain stimulable phosphor particles.

2. The process of claim 1, wherein said stimulable phosphor particles have an average particle size of 1 to 10 μm.

3. The process of claim 1, wherein said particles of two kinds of metal oxides each have an average particle size of 2 to 50 nm.

4. The process of claim 1, wherein said two kinds of metal oxides are selected from the group consisting of $Al_2O_3$, $SiO_2$ and $TiO_2$.

5. The process of claim 4, wherein said two kinds of metal oxide are $Al_2O_3$ and $SiO_2$.

6. The process of claim 5, wherein a weight ratio of $Al_2O_3$:$SiO_2$ is 1:2 to 1:10.

7. The process of claim 4, wherein said two kinds of metal oxide are $Al_2O_3$ and $TiO_2$.

8. The process of claim 7, wherein a weight ratio of $Al_2O_3$:$TiO_2$ is 1:2 to 1:10.

9. The process of claim 1, wherein said metal oxide particles have an average particle size of 2 to 50 nm.

10. The process of claim 1, wherein a total amount of said fine particles of at least two kinds of metal oxides is 0.001% to 10% by weight, based on the particles of the precursor.

11. The process of claim 1, wherein the process further comprises (d) coating the obtained stimulable phosphor particles with a silane coupling agent.

12. The process of claim 11 wherein an amount of the silane coupling agent to be coated is 0.1% to 10% by weight, based on the phosphor particles.

13. Rare earth activated alkaline earth metal fluorohalide stimulable phosphor particles represented by the following formula (1):

$$Ba_{(1-x)}M^2_xFX:yM^1, zLn \qquad \text{formula (1)}$$

wherein $M^2$ is at least an alkaline earth metal selected from the group consisting of Mg, Ca, Sr, Zn and Cd; $M^1$ is at least an alkali metal selected from the group consisting of Li, Na, K, Rb and Cs; X is at least a halogen atom selected from the group consisting of Cl, Br and I; Ln is at least a rare earth element selected from the group consisting of Ce, Pr, Sm, Eu, Gd, Tb, Tm, Dy, Ho, Nd, Er and Yb; and x, y and z are numbers within the range of $0 \leq x \leq 0.6$, $0 \leq y \leq 0.05$ and $0 < z \leq 0.2$, respectively;

the phosphor particles have an average particle size of 1 to 10 μm and are prepared by a process, as claimed in claim 1.

14. The stimulable phosphor particles of claim 13, wherein said at least two kinds of metal oxides are selected from the group consisting of $Al_2O_3$, $SiO_2$ and $TiO_2$.

15. The stimulable phosphor particles of claim 14, wherein said at least two kinds of metal oxide are $Al_2O_3$ and $SiO_2$.

16. The stimulable phosphor of claim 15, wherein a weight ratio of $Al_2O_3$:$SiO_2$ is 1:2 to 1:10.

17. The stimulable phosphor particles of claim 14, wherein said at least two kinds of metal oxide are $Al_2O_3$ and $TiO_2$.

18. The stimulable phosphor of claim 17, wherein a weight ratio of $Al_2O_3$:$TiO_2$ is 1:2 to 1:10.

19. The stimulable phosphor particles of claim 13, wherein a total amount of said fine particles of at least two kinds of metal oxides are 0.001% to 10% by weight, based on the particles of the precursor.

20. A radiation image conversion panel comprising a support having thereon a phosphor layer containing a binder and a stimulable phosphor particle, wherein the stimulable phosphor particles are rare earth activated alkaline earth metal fluorohalide stimulable phosphor particles represented by the following formula (1):

$$Ba_{(1-x)}M^2_xFX:yM^1, zLn \qquad \text{formula (1)}$$

wherein $M^2$ is at least an alkaline earth metal selected from the group consisting of Mg, Ca, Sr, Zn and Cd; $M^1$ is at least an alkali metal selected from the group consisting of Li, Na, K, Rb and Cs; X is at least a halogen atom selected from the group consisting of Cl, Br and I; Ln is at least a rare earth element selected from the group consisting of Ce, Pr, Sm, Eu, Gd, Tb, Tm, Dy, Ho, Nd, Er and Yb; and x, y and z are numbers within the range of $0 \leqq x \leqq 0.6$, $0 \leqq y \leqq 0.05$ and $0 < z \leqq 0.2$, respectively;

the phosphor particles have an average particle size of 1 to 10 $\mu$m and are prepared by a process, as claimed in claim 1.

* * * * *